US010567232B2

(12) United States Patent
Cohen et al.

(10) Patent No.: US 10,567,232 B2
(45) Date of Patent: Feb. 18, 2020

(54) SYSTEM AND METHOD FOR MAPPING A CONNECTIVITY STATE OF A NETWORK

(71) Applicant: Microsoft Technology Licensing, LLC, Redmond, WA (US)

(72) Inventors: Jeffrey T. Cohen, Issaquah, WA (US); Yves Pitsch, Mercer Island, WA (US); Mahesh Kumar Nayak, Kirkland, WA (US); Kapil Bisht, Bothell, WA (US); Spencer Giacalone, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 273 days.

(21) Appl. No.: 15/599,534

(22) Filed: May 19, 2017

(65) Prior Publication Data

US 2018/0337828 A1 Nov. 22, 2018

(51) Int. Cl.
| | |
|---|---|
| G06F 15/173 | (2006.01) |
| H04L 12/24 | (2006.01) |
| H04W 24/08 | (2009.01) |
| H04L 12/26 | (2006.01) |
| H04M 3/22 | (2006.01) |
| G06F 16/951 | (2019.01) |

(52) U.S. Cl.
CPC .......... *H04L 41/12* (2013.01); *H04L 43/0811* (2013.01); *H04W 24/08* (2013.01); *G06F 16/951* (2019.01); *H04L 41/02* (2013.01); *H04L 41/0213* (2013.01); *H04L 41/0226* (2013.01); *H04M 3/2254* (2013.01)

(58) Field of Classification Search
USPC .......................... 709/242, 224, 227, 228, 229
See application file for complete search history.

(56) References Cited

U.S. PATENT DOCUMENTS

| | | |
|---|---|---|
| 8,832,498 B1 | 9/2014 | Jain et al. |
| 9,288,158 B2 | 3/2016 | Boss et al. |
| 2007/0106768 A1 | 5/2007 | Frietsch et al. |

(Continued)

OTHER PUBLICATIONS

Fujita, et al.; "DS-Bench Toolset: Tools for Dependability Benchmarking with Simulation and Assurance"; Jun. 25, 2012; 8 pages.

(Continued)

*Primary Examiner* — Lan Dai T Truong
(74) *Attorney, Agent, or Firm* — Ray Quinney & Nebeker, P.C.; Thomas M. Hardman; Sunah K. Lee

(57) ABSTRACT

A connectivity state mapping system for mapping physical connections between interfaces of devices in a network is provided. The system includes at least one processor, at least one memory, and an application including instructions, which are executable by the at least one processor. The instructions are configured to: group the interfaces into groups; select one of the groups based on a predetermined fault plan; determine utilization parameters; based on the utilization parameters, cause at least one fault in one or more of the interfaces in the selected group; monitor events corresponding to the at least one fault and log data indicative of errors detected at the interfaces of the selected one of the groups; and based on the at least one fault and the predetermined fault plan, correlate the data to identify physical connections between two or more of the devices in the network.

20 Claims, 7 Drawing Sheets

(56) References Cited

U.S. PATENT DOCUMENTS

2013/0268799 A1 10/2013 Mestery et al.
2015/0227598 A1 8/2015 Hahn et al.
2015/0281113 A1 10/2015 Siciliano et al.
2015/0326457 A1 11/2015 Wu et al.

OTHER PUBLICATIONS

"Scaling Based on Metrics"; http://docs.aws.amazon.com/autoscalinq/latest/userguide/policy_creatinq.html; retrieved Mar. 24, 2017; 8 pages.
"SN 16000 BB-DCS/Optical Switch"; Coriant Datasheet; Mar. 19, 2015; 2 pages.
"Application Guide for Lenovo Cloud Network Operating System 10.01"; Lenovo Network; Jun. 2016; pp. 1-500.
Yazdanov, Lenar; "Towards Auto-Scaling in the Cloud"; Apr. 9, 2014; pp. 1-33.
Chapell, David, "Introducing Microsoft System Center Operations Manager 2007", Retrieved From: http://download.microsoft.com/documents/australia/takecontrol/IntroducingSystemCenterOperationsManager2007.pdf, Apr. 2007, 33 Pages.
"International Search Report and Written Opinion Issued in PCT Application No. PCT/US18/028776", dated Jul. 18, 2018, 12 Pages.

SYSTEM AND METHOD FOR MAPPING A CONNECTIVITY STATE OF A NETWORK

FIELD

The present disclosure relates to network connectivity, and more particularly to mapping physical connections between network devices and interfaces.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Cloud-based networks allow computer processing and storing needs to be moved from on premises networks to hybrid cloud or fully cloud-based networks while satisfying data security access requirements. A cloud-based network may include physical machines (PMs) and virtual machines (VMs). Cloud applications may be implemented via the PMs and/or the VMs. The cloud applications can be accessed from client stations of organizations at remote locations.

SUMMARY

A connectivity state mapping system for mapping physical connections between interfaces of devices in a network is provided. The system includes at least one processor, at least one memory, and an application stored in the at least one memory and including instructions, which are executable by the at least one processor. The instructions are configured to: group the interfaces into groups; select one of the groups based on a predetermined fault plan; determine utilization parameters; based on the utilization parameters, cause at least one fault in one or more of the interfaces in the selected group; monitor events corresponding to the at least one fault and log data indicative of errors detected at the interfaces of the selected one of the groups; and based on the at least one fault and the predetermined fault plan, correlate the data to identify physical connections between two or more of the devices in the network.

In other features, a connectivity state mapping system for mapping physical connections of devices in a network is provided. The system includes a processor, a memory, and an application. The application is stored in the memory and includes instructions, which are executable by the processor and are configured to: group the devices or interfaces of the devices into groups; select one of the groups based on a predetermined connectivity interference schedule; determine utilization parameters; based on the utilization parameters and the connectivity interference schedule, cause errors in the interfaces in the selected group; monitor events corresponding to the at least one fault and log data indicative of errors detected at the devices of the selected one of the groups; and based on the at least one fault and the predetermined connectivity interference schedule, correlate the data to identify physical connections between two or more of the interfaces in the network.

In other features, a non-transitory tangible computer readable medium is provided for storing instructions executable by a processor for mapping physical connections of devices in a network. The instructions are for: grouping the devices or interfaces of the devices into groups; selecting one of the groups based on a predetermined fault plan; determining utilization parameters; based on the utilization parameters and the predetermined fault plan, causing errors in the interfaces in the selected group; monitoring events corresponding to the at least one fault and log data indicative of errors detected at the devices of the selected one of the plurality of groups; and based on the at least one fault and the predetermined fault plan, correlating the data to identify physical connections between two or more of the interfaces in the network.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 1:
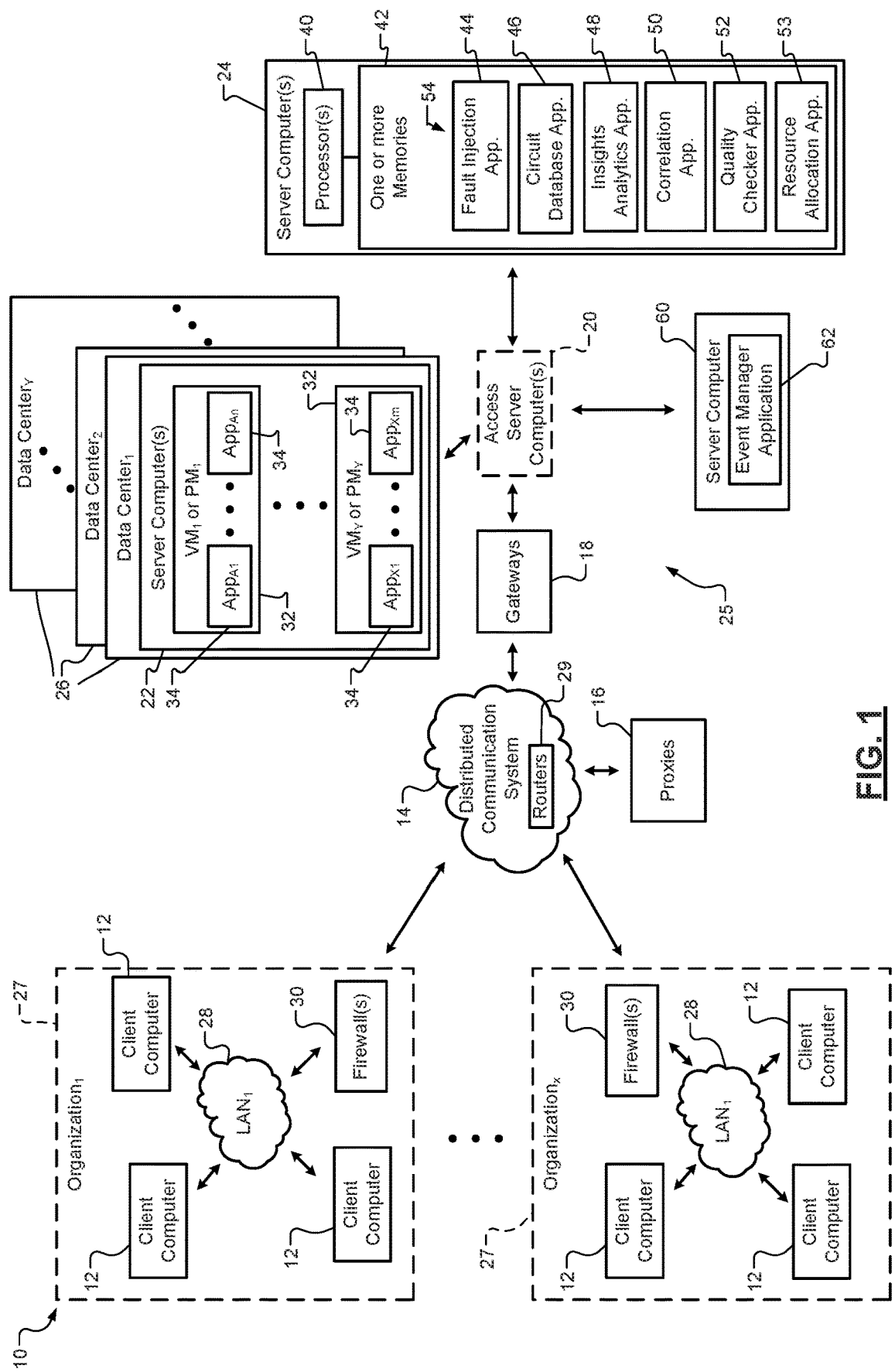
FIG. 1 is a functional block diagram of an example of a network associated with a cloud-based service provider including a connectivity state mapping system in accordance with an embodiment of the present disclosure.

Service providers that provide cloud-based services include extensive networks of devices and circuits including routers, switches, server computers, etc. These networks include numerous physical connections between interfaces of the network devices. The physical connections include connections between network devices in multiple layers of the open systems interconnection (OSI) model. For example, layer one (L1)-to-L1, L1-to-L3, and L3-to-L3 connections exist between network devices of a cloud-based service provider. The physical connections are often changed and need to be tracked for updated "as-built" topology snapshot. The physical connections may be changed because of maintenance, site refresh, deployment and/or decommission events. The networks may be highly parallel configured to handle failures. The physical connections need to be tracked to maintain an "as-built" network topology snapshot. A traditional method of tracking and mapping physical connections between network devices includes physical auditing/scanning and/or marking the network devices and generating tickets. The tickets indicate the existing connections and information on the tickets is eventually entered into a tracking system. The tracking system updates and stores a physical connection database including the connections indicated by the tickets. This method typically includes database dumps and/or physical audits, which are time consuming to execute. The traditional method is not scalable for extensive networks, such as cloud-based networks. Also, automatic determination of physical connections is limited due to, for example, limitations in some L1/optical devices, such as lack of link layer discovery protocol (LLDP) support and/or other protocols that aid in allowing a system to determine connections. These protocols may be supported by L3 devices.

Traditional methods of reporting and updating changes in a physical connection database to maintain the "as-built" network topology up-to-date are slow and unable to keep up with quickly expanding and changing networks of a cloud-based service provider. Data freshness and accuracy remain an issue in large networks, such as cloud-based networks. For example, a cloud-based service provider, such as Microsoft®, may have an overall network that is growing at a rate as high as 90% year after year. Traditional physical connection tracking methods are unable to update the physical connection database quick enough for a network growing at this rate. Traditional physical connection tracking methods have difficulty keeping up with a network that is growing at a much slower rate year after year than that of cloud-based service providers, such as Microsoft®. Thus, data in the physical connection database can be outdated, inaccurate and simply not include newly created connections.

The examples set forth herein include connectivity state mapping systems and methods for mapping physical connections between interfaces of network devices, such as network devices in a wide area network circuit involving L1 and L3 network devices. The connectivity state mapping systems are automated and scalable and are able to quickly change and maintain an updated physical connection database. The mapping includes identifying and recording physical connections between network devices in different layers (e.g., L1 and L3 layers of the OSI model). The methods include systematically causing errors/faults in network devices (e.g., disabling and/or turning OFF selected interfaces), tracking responses and/or alerts generated as a result of the errors/faults and determining physical connections based on the responses and/or alerts. These and other aspects are further described below.

Figure 3:
FIG. 3 is a functional block diagram of an example of local and remote Internet protocol (IP) devices communicating with each other via optical devices and an optical network.

FIG. 1 shows an example of a network 10 associated with a cloud-based service provider that includes client computers 12, a distributed communication system 14, proxies 16, gateways 18, one or more access server computers 20, and other server computers 22, 24. In some examples, the gateways 18, one or more access server computers 20, and one or more server computers 22 are implemented in a cloud-based network 25. Although the network 10 is shown including a single cloud-based network and certain network devices, the network may include any number of cloud-based and non-cloud-based networks and network devices of various types and associated with multiple layers of the OSI model. The server computers 22, 24 may be implemented in data centers; example data centers 26 are shown. Each of the data centers may include data storage and any number of server computers. Example data storage is shown in FIG. 3. The data centers may be located in corresponding geographical regions, where each geographical region refers to: geographical areas of one or more businesses; one or more towns; one or more cities; one or more states; one or more countries; a continent; and/or other geographical area. In some examples, the one or more server computers 24 are implemented in the cloud-based network 25 or in another service provider network. In another example, the access server computers 20 are not included in the security system 10 and the gateways 18 communicate directly with the server computers 22, 24. In the example shown, the client computers are owned by corresponding organizations 27. The organizations 27 may include local area networks (LANs) 28 and firewalls 30. The client computers 12 may access the distributed communication system 14 directly and/or via the LANs 28 and firewalls 30. The distributed communication system 14 may include routers 29. One or more of the organizations 27 may include multiple LANs and corresponding client computers, where each LAN and corresponding client computers are located in a corresponding one of the geographical regions of the data centers 26.

The cloud-based network 25 may be implemented by a cloud service provider and, in an embodiment, includes client virtual machines, network appliances and application server computers. Examples of network appliances include routers, switches, firewalls, proxy server computers, World Wide Web (or Web) server computers, wide area network (WAN) accelerators, intrusion detection system (IDS) devices, and intrusion prevention system (IPS) devices. The network appliances provide intermediary services between the application server computers and client computers. The client computers 12 can be implemented in the cloud-based network 25 as VMs and/or PMs 32 or can be located on premises. The network appliances and application server computers may be implemented as one or more VMs of the cloud-based network 25.

The cloud-based network 25 may include one or more of the server computers 22, 24. The cloud-based network 25 further includes resources that may be shared by the client computers 12. The cloud service provider provisions the resources, such as software applications having corresponding executable code, server computer processing time, server computer processor speed, data storage, VMs, PMs, and/or other resources to tenants (e.g., customers and/or businesses) via the cloud-based network 25. The resource may include user management tools, security application resources, or other resources, such as that provided by Microsoft® Azure®, an example of which being HDInsight®. A tenant may have one or more subscriptions. A subscription may refer to, for example, rental of one or more resources, a container, a set of machines, a logic subset of machines of a business, and/or a business unit. A business unit includes a set of PMs and/or VMs of a tenant.

Cloud service providers implement infrastructure as a service (IaaS) and platform as a service (PaaS) using VMs or containers. A container includes processing, storage and application resources. Data centers may include server computers that host the VMs or containers. Each server can host many VMs and/or containers. The VMs run on a guest operating system and interface with a hypervisor, which shares and manages server hardware and isolates the VMs. Unlike VMs, containers do not need a full OS to be installed or a virtual copy of the host server's hardware. Containers may include a few software modules and libraries and require the use of some portions of an operating system. As a result of the reduced footprint, many more containers can be deployed on a server as compared to virtual machines. The server computers 22, 24 may include VMs (e.g., $VMs_{1-Y}$ are shown), which may be implemented as PMs (e.g., PMs$_{1-y}$). The software applications may be implemented on the server computers 22, 24, which may be referred to as physical machines.

The client computers 12 may be privately owned by different individuals and/or entities. In the example shown, the client computers 12 are owned by organizations 27. Each of the client computers 12 may access one or more cloud applications 34 stored in the server computers 22 and/or VMs 32. The organizations 27 may own and/or have paid access to corresponding ones of the VMs 32 and/or cloud applications 34. The client computers 12 may include desk/laptop computers, tablets, mobile phones, wearable devices, access terminals, and/or other network devices for accessing the cloud applications 34. Accessing of the cloud applications 34 may include: communicating with the cloud applications 34; transferring data, packets, information, etc. between the client computers 12 and the server computers 22 in association with the cloud applications 34; modifying and/or updating the cloud applications; and/or uploading and/or downloading the cloud applications 34 and/or files associated with the cloud applications 34.

The distributed communication system 14 may include routers, switches and/or other network devices for directing data and/or packets between (i) the client computers 12 and/or organizations 27 and (ii) the gateways 18. The distributed communication system 14 may include a network, such as a local area network (LAN), a wireless local area network (WLAN), and/or a wide area network (WAN) (e.g., the Internet). The proxies 16 may transfer data, packets, information, etc. between the firewalls 30 and the gateways 18. In an embodiment, the proxies 16 are implemented as part of the distributed communication system 14. The gateways 18 may transfer data, packets, information, etc. between the distributed communication system 14 and the access server computers 20. The access server computers 20 may provide access to direct communication with the server computers 22 and/or 24. In one embodiment, the access server computers 20 are implemented as client access server computers and facilitate providing services, such as services associated with software as a service (SaaS) applications, from the server computer 24 to the client computers 12. The gateways 18, the access server computers 20, the server computers 22 and/or the server computers 24 may be implemented in an internal network of a service provider that provides software applications.

Each of the server computers 24 includes a processor 40 that execute software applications, which are stored in one or more memories 42. One or more of the VMs 32 and/or other resources to be allocated to customers may be implemented in the server computers 24. The applications include a fault injection application 44, a circuit database application 46, an insights analytics application 48, a correlation application 50, a quality checker application 52, and a resource allocation application 53. The applications 44, 46, 48, 50, 52, 53 may be referred to collectively as a connectivity state mapping system 54. In one embodiment, the applications 44, 46, 48, 50, 52, 53 are implemented in respective processors.

Execution of the applications 44, 46, 48, 50, 52, 53 may include execution of respective algorithms and/or methods including use of one or more equations to perform fault injection and correlation operations. The applications 44, 46, 48, 50, 52, 53 may be SaaS applications and may be iteratively executed for consecutive periods of time. The fault injection application 44 causes errors to occur in selected network devices and/or at selected interfaces of the network devices. The circuit database application 46 stores in a physical connection database data indicating connections between network devices. The insights analytics application 48 collects alerts and/or response signals generated based on the errors caused by the fault injection application 44. The insights analytics application 48 collects log data across different cloud services (e.g., services provided by Microsoft Azure®). The correlation application 50 correlates the errors caused by the fault injection application 44 with the alerts and/or responses generated based on the errors to detect physical connections between network devices and interfaces. The quality checker application 52 may verify the detected connections and update a connectivity state map in the physical connection database 152. The resource allocation application 53 adjusts resource allocation and/or physical connections based on the updated connectivity state map in the physical connection database 152. The applications 44, 46, 48, 50, 52, 53 are further described below with respect to FIGS. 4 and 8.

The cloud-based network 25 may further include a server computer 60 that includes an event manager application 62. The event manager application 62 may control and/or monitor, for example, planned maintenance on network devices. The event manager application 62 may monitor states of network devices and/or interfaces in the network 10 and/or schedule when certain actions are to be performed at the network devices and/or interfaces. The event manager application 62 may communicate with the fault injection application 44 and/or the correlation application 50. For example, the fault injection application 44 may generate an error request signal to request that certain interfaces be turned OFF and send the error request signal to the event manager application 62 to turn OFF the interfaces. The timing of when the interfaces are turned OFF may be requested by the fault injection application 44 and/or determined by the event manager application 62. As another example, the correlation application 50 may request error information pertaining to errors caused as a result of responding to the error request signal (e.g., turning OFF the interfaces) and/or timing of when the errors occur. Other examples are described below.

Figure 2:
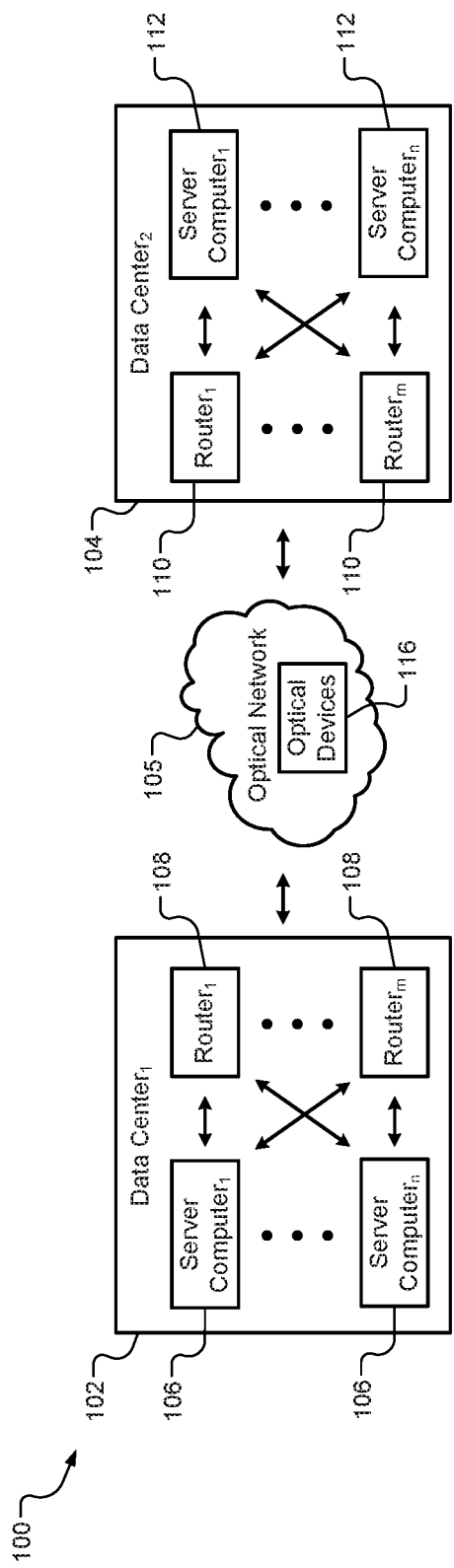
FIG. 2 is a functional block diagram of an example of a portion of a cloud-based network illustrating communication between data centers via an optical network.

FIG. 2 shows a portion 100 of the cloud-based network 25 illustrating communication between two data centers 102, 104 via an optical network 105. The data centers 102, 104 may refer to two of the data centers of FIG. 1. The data center 102 may include server computers 106 and routers 108. The data center 104 may include routers 110 and server computers 112. The routers 108 may communicate with the routers 110 via the optical network 105 that includes optical devices 116. The optical devices 116 are L1 devices and may include, for example, fiber optic cables, optical hubs and/or optical repeaters. The routers 108, 110 may be L3 devices. Any number of physical connections may exist (i) between each of the server computers 106 and each of the routers 108, (ii) between each of the routers 108 and the optical devices 116, (iii) between the optical devices 116 and each of the routers 110, and (iv) between each of the routers 110 and each of the server computers 112. These connections including identifiers of start and end terminals (or ports) and the corresponding network devices and/or interfaces may be affected by errors and/or error request signals generated by the fault injection application 44 and detected by the correlation application 50 of FIG. 1.

FIG. 3 shows local and remote IP devices 130, 132 communicating with each other via local and remote optical devices 134, 136 and an optical network 138. The IP devices 130, 132 are L3 devices, such as routers, switches, etc. The optical devices 134, 136 and other optical devices included in the optical network 138 are L1 devices, such as optical repeaters, hubs, etc. This is an example illustrating L3-to-L1 communication, L1-to-L1 communication, and L1-to-L3 communication. Any number of physical connections may exist (i) between the local IP device 130 and the local optical device 134, (ii) between the local optical device 134 and the optical network 138, (iii) between the optical network 138 and the remote optical device 136, and (iv) between the remote optical device 136 and the remote IP device 132. These connections including identifiers of start and end terminals (or ports) and the corresponding network devices and/or interfaces may be affected by errors and/or error request signals generated by the fault injection application 44 and detected by the correlation application 50 of FIG. 1.

Figure 4:
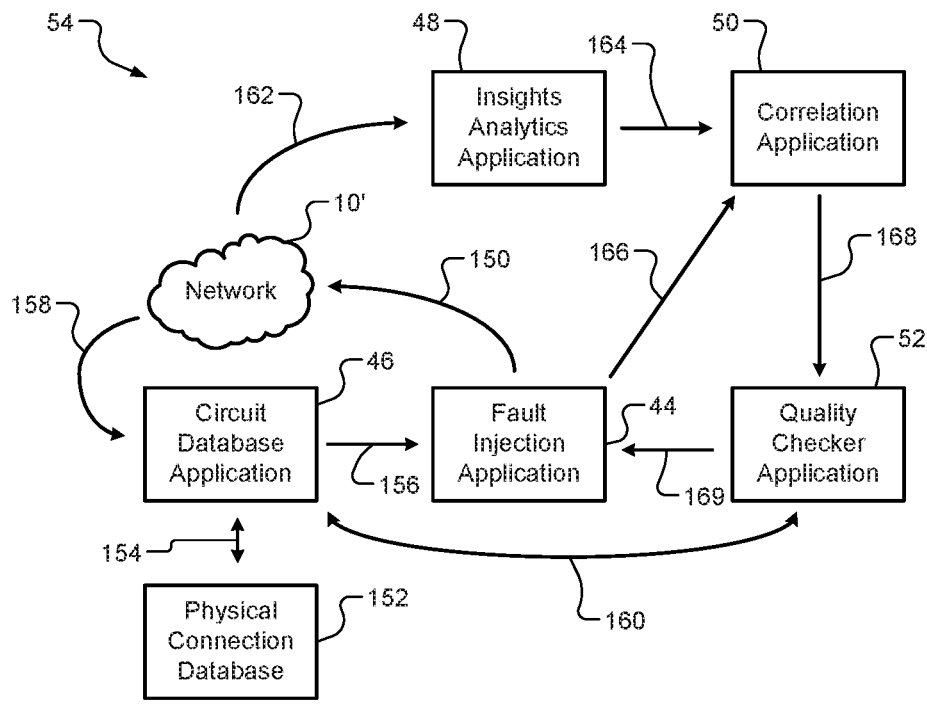
FIG. 4 is a functional block diagram of an example of the connectivity state mapping system of FIG. 1 illustrating signal transfers between network devices and applications.

FIG. 4 shows the connectivity state mapping system 54 of FIG. 1 illustrating signal transfers between network devices and applications. The connectivity state mapping system 54 includes the fault injection application 44, the circuit database application 46, the insights analytics application 48, the correlation application 50 and the quality checker application 52. The fault injection application 44 causes errors in network devices in a network 10' (e.g., the network 10 of FIG. 1). This may include generation of error request signals that may be sent directly to network devices and/or interfaces of the network 10' or to an event manager application (e.g., the event manager application 62 of FIG. 1) as represented by arrow 150. The network 10' may include data centers, server computers, optical network devices, routers, switches, interfaces, wide area networks (WANs), LANs, client networks and corresponding client computers, etc.

The error request signals may be based on information in the connectivity state map in a physical connection database 152. Transfer of the stated information from the physical connection database 152 to the fault injection application 44 is represented by arrows 154, 156. The circuit database application 46 may update the physical connection database based on signals from the network devices in the network 10' and/or signals from the quality checker application 52, as represented respectively by arrows 158, 160.

The insights analytics application 48 may pull status information including alerts and responses associated with errors caused by the fault injection application 44 from the network devices in the network 10'. This is represented by arrow 162. The insights analytics application 48 may log the pulled information and provide the log to the correlation application 50, as represented by arrow 164. As an example, each row of the log may be associated with a particular alert and/or response. The insights analytics application 48 may be a log analytics platform for interactive data exploration services. The insights analytics application 48 may collect telemetry data and store tables of data associated with traces, events, requests, metrics, etc.

The correlation application 50 may also pull information associated with the errors caused by the fault injection application 44 and/or related information from the event manager application 62 of FIG. 1. This is represented by arrow 166. The correlation application correlates the errors, the collected data and corresponding information and indicates existing physical connections and information associated with the physical connections to the quality checker application 52. This is represented by arrow 168. The quality checker application verifies the as-built network topology snapshot of physical connections and may update the physical connection database 152 via the circuit database application 46. This is also represented by arrows 160 and 154. The quality checker application 52 may inform the fault injection application 44 when the verification has been completed, as represented by arrow 169.

Figure 5:
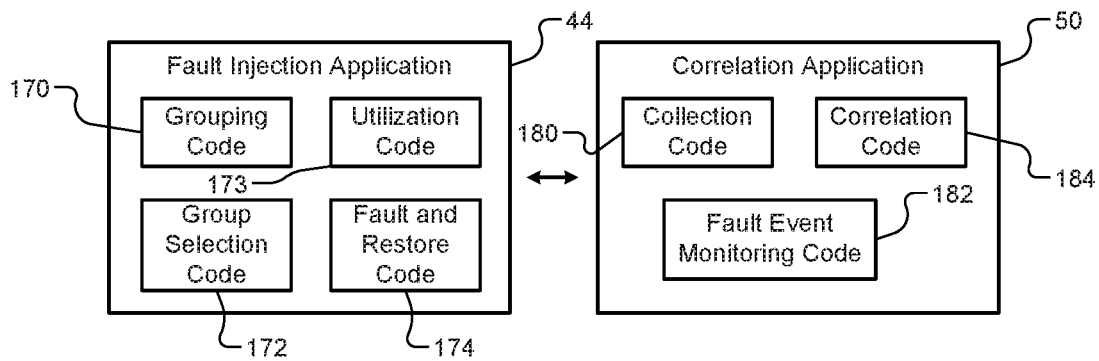
FIG. 5 is a functional block diagram of an example of a fault injection application and a correlation application of the connectivity state mapping system of FIG. 1.

FIG. 5 shows a fault injection application 44 and a correlation application 50 of the connectivity state mapping system 54 of FIGS. 1 and 4. The fault injection application 44 may include codes, some examples of which being grouping code 170, group selection code 172, utilization code 173, and fault and restore code 174. The correlation application 50 may include collection code 180, fault event monitoring code 182 and correlation code 184. The codes 170, 172, 173, 174, 180, 182, 184 refer to software code of the applications 44, 50 and are provided as examples. Operations associated with the codes 170, 172, 173, 174, 180, 182, 184 and operations associated with the applications 44, 46, 48, 50, 52 of FIGS. 1 and 4-5 are further described below with respect to the method of FIG. 8.

Figure 6:
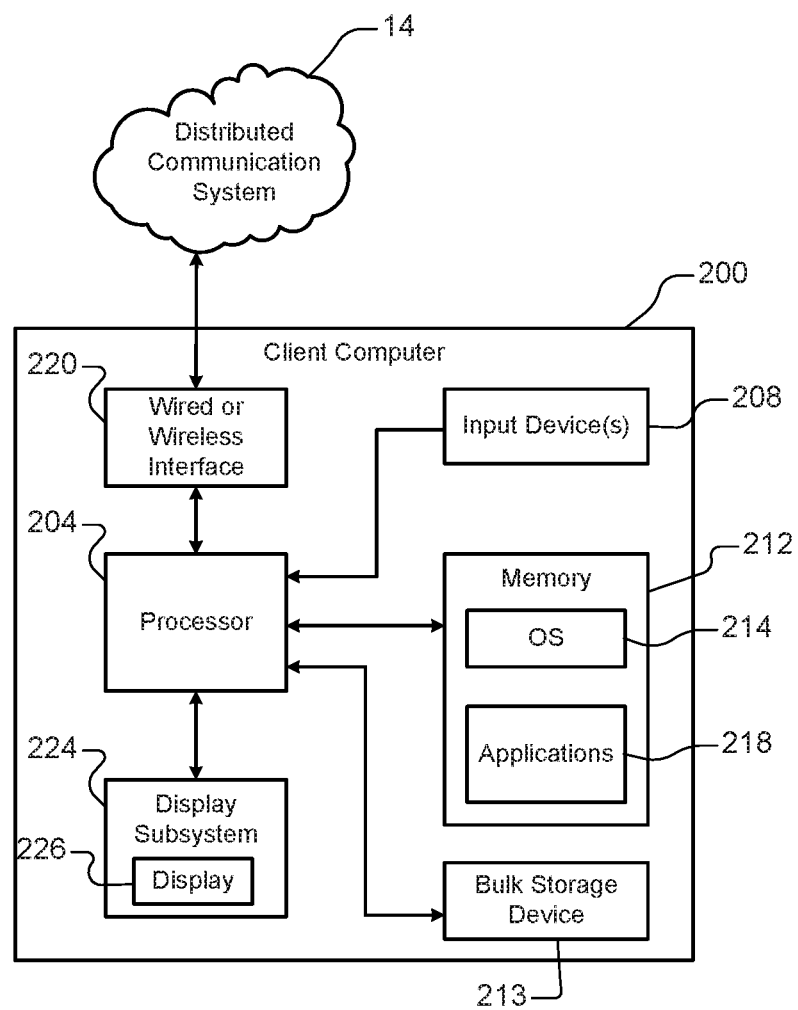
FIG. 6 is a functional block diagram of an example of a client computer in accordance with an embodiment of the present disclosure.

In FIG. 6, a simplified example of a client computer 200 is shown. The client computers 12 of FIG. 1 may be implemented as the client computer 200. The client computer 200 includes a central processing unit (CPU) or processor 204 and an input device 208 such as a keypad, touchpad, mouse, etc. The client computer 200 further includes memory 212 such as volatile or nonvolatile memory, cache or other type of memory. The client computer 200 further includes bulk storage device 213 such as flash memory, a hard disk drive (HDD) or other bulk storage device.

The processor 204 of the client computer 200 executes an operating system 214 and one or more applications 218. For example, the applications 218 may include a browser. The client computer 200 further includes a wired interface (such as an Ethernet interface) and/or wireless interface (such as a Wi-Fi, Bluetooth, near field communication (NFC) or other wireless interface (collectively identified at 220)) that establishes a communication channel over the distributed communication system 14. The client computer 200 further includes a display subsystem 224 including a display 226.

Figure 7:
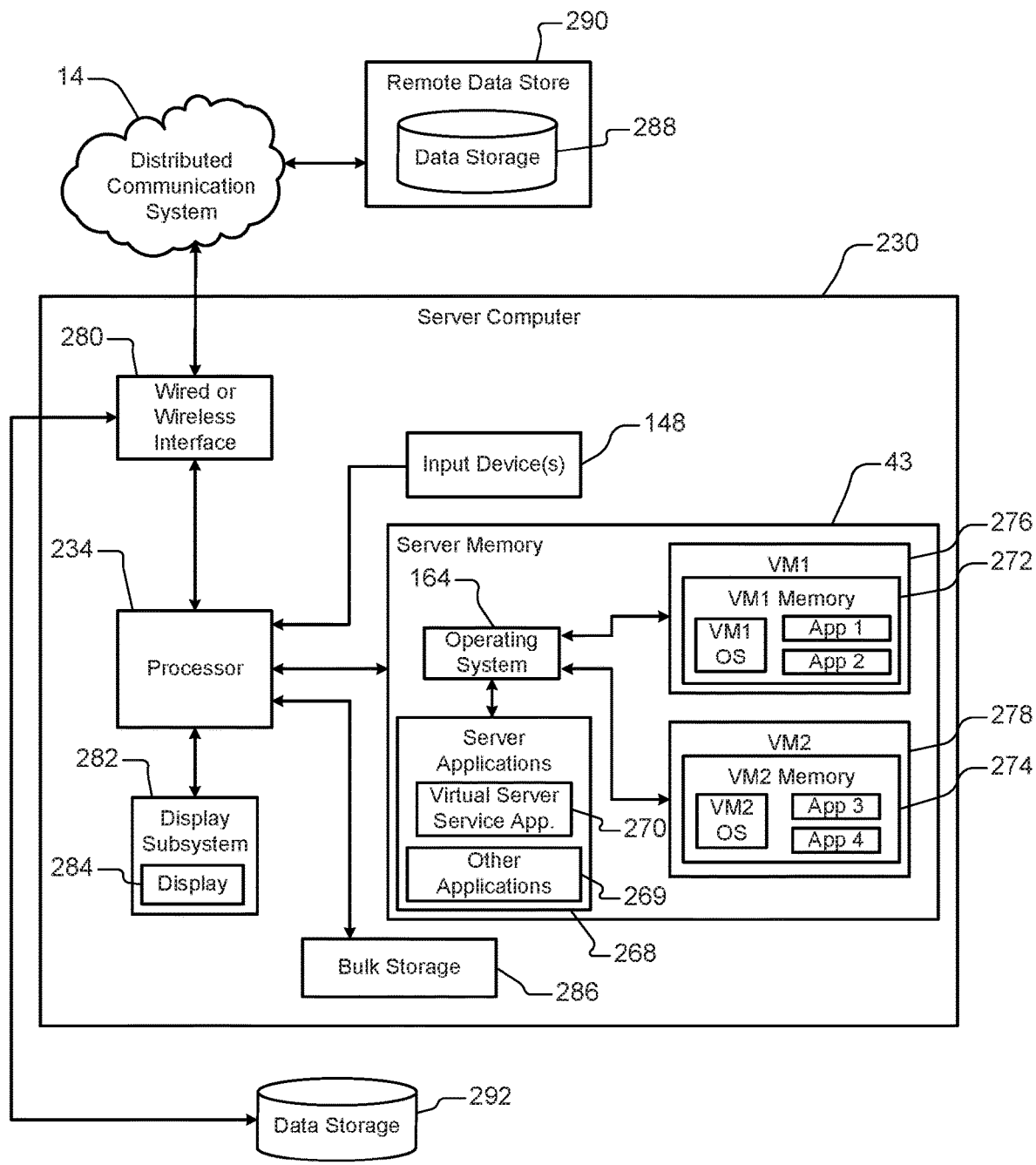
FIG. 7 is a functional block diagram of an example of a server computer incorporating applications in accordance with an embodiment of the present disclosure.

In FIG. 7, an example of a server computer 230 is shown. The server computers 20, 22, 24 of FIG. 1 may be implemented as and/or have similar architecture as the server computer 230. The server computer 230 includes one or more processors and an input device 148 such as a keypad, touchpad, mouse, etc. The server computer 230 further includes a server memory 232, such as volatile or nonvolatile memory, cache or other type of memory, and a processor 234. The processor 234 executes an operating system (OS) 264 and one or more server applications 268 and/or VM applications. Examples of server applications include the application 44, 46, 48, 50, 52, 53 of FIGS. 1 and 4 (collectively identified as other applications 269) and a virtual server service application 270, which is implemented in a virtualization layer and is executed along with the OS 264. The virtual server service application 270 creates a virtual environment in which VM (or guest) OSs (e.g., VM1 OS and VM2 OS) run. Example VM applications App 1, App 2, App 3, and App 4 are shown as being implemented in VM memories 272, 274 of VMs 276, 278, respectively. The VM applications may include instances of auto-generated websites, network appliances, storage applications, productivity applications, and/or other VM applications. VM applications App 1-4 are shown as examples. Each of the VM memories may include one or more VM applications.

The server computer 230 further includes a wired or wireless interface 280 that establishes a communication channel over the distributed communication system 14. The server computer 230 further includes a display subsystem 282 that includes a display 284. The server computer 230 may further include a bulk storage device 286 such as flash memory, a hard disk drive (HDD) or other local or remote storage device. The processor 234 may also access a data storage 288 of a remote data store 290 via the interface 280 and the distributed communication system 14, or a data storage 292, such as a database, via the interface 280. One or more of the operating systems on the client computers of FIGS. 1 and 6 and the server computers of FIGS. 1 and 7 may be Windows® based operating systems, which allow for detecting creation of new user accounts.

adjusted based on the utilization parameters and limits described for operations 308, 310, 314. For example, the scale unit/upgrade domain may be decreased if one or more of the below described limits are exceeded. In one embodiment, the devices and/or interfaces are grouped in an isolated manner to minimize impacting network performance for customers. The grouping may be based on the utilization parameters.

TABLE 1

Group Table

| Geographical Region | Data Center (DC) | Device Name | Interface | Group Name | Scale Unit/Upgrade Domain |
|---|---|---|---|---|---|
| Asia-Pacific (APAC) | DC1 | Device1 | Int1 | APAC.DC1.Device1.Int1 | 1 |
|  | DC1 | Device1 | Int2 | APAC.DC1.Device1.Int2 | 1 |
|  | DC1 | Device1 | Int3 | APAC.DC1.Device1.Int3 | 1 |
|  | DC1 | Device1 | Int4 | APAC.DC1.Device1.Int4 | 2 |
|  | DC1 | Device1 | Int5 | APAC.DC1.Device1.Int5 | 2 |
|  | DC1 | Device1 | Int6 | APAC.DC1.Device1.Int6 | 2 |
|  | DC1 | Device2 | Int1 | APAC.DC1.Device2.Int1 | 1 |
|  | DC1 | Device2 | Int2 | APAC.DC1.Device2.Int2 | 1 |
|  | DC1 | Device2 | Int3 | APAC.DC1.Device2.Int3 | 2 |
|  | DC2 | Device3 | Int1 | APAC.DC2.Device3.Int1 | 1 |
|  | DC2 | Device3 | Int2 | APAC.DC2.Device3.Int2 | 2 |
|  | DC2 | Device3 | Int3 | APAC.DC2.Device3.Int3 | 2 |

Figure 8A:
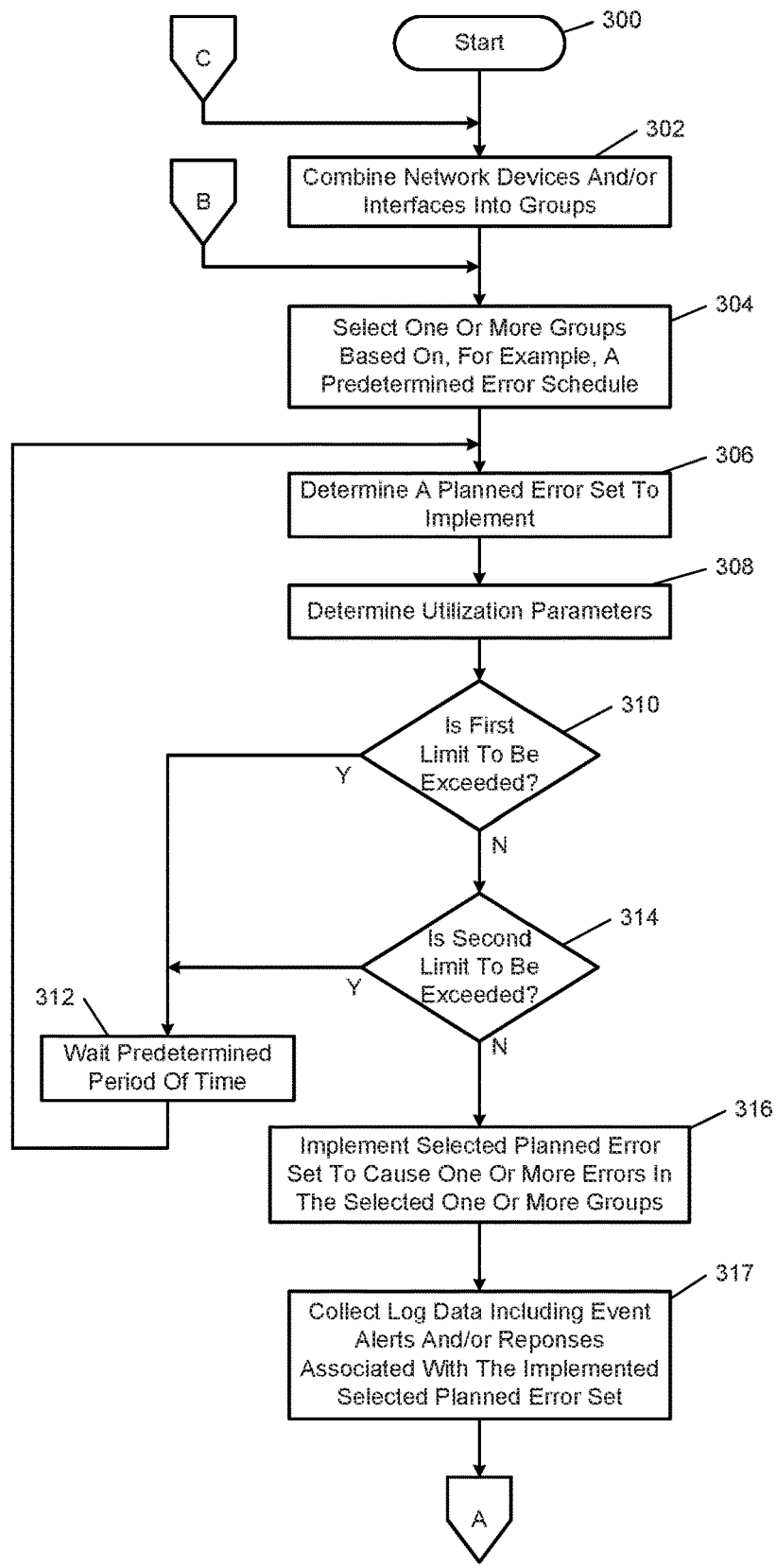
FIGS. 8A and 8B (collectively FIG. 8) illustrate a connectivity state mapping method in accordance with an embodiment of the present disclosure.
Figure 8B:
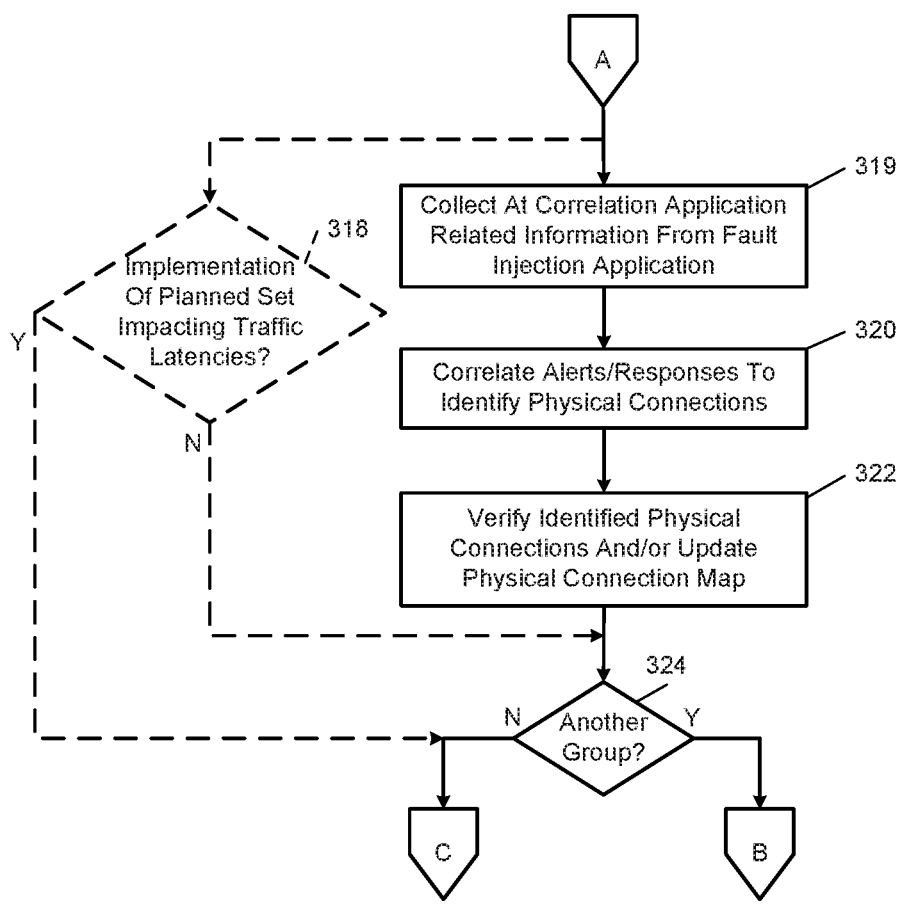

FIG. 8 shows a method. The method begins at 200 and includes execution of the applications 44, 46, 48, 50, 52 by the processor(s) 40. Although the following operations are primarily described with respect to the implementations of FIG. 1, the operations may be modified to apply to other implementations of the present disclosure. The operations may be iteratively performed.

At 302, the grouping code 170 is executed to combine network devices and/or interfaces into predetermined groups. The network devices and/or interfaces may be grouped based on: amounts of traffic passing through the network devices and/or interfaces; down times of the network devices and/or interfaces; maintenance schedules of the network devices and/or interfaces; device type; device name; data center ID; availability of the network devices and/or interfaces; and/or other parameters. Each of the groups may include network devices, circuits, links, interfaces, ports, etc. Table 1 shows example parameters of groups including geographical region(s), data centers, device names, interfaces, and scale unit/upgrade domains. The parameters in Table 1 may be grouped based on one or more of the geographical region(s), data centers, device names, interfaces, and scale unit/upgrade domains. The geographical region(s) may identify the country, state, city, county, etc. involved. In the example shown, the group name identifies the name of the group and the corresponding geographical region(s), the data center, and the device name. The group name may identify the name of the group and/or the geographical region(s), the data center, the device name, the interface, the scale unit/upgrade domain, and/or one or more other parameters. In one embodiment, the groups are based on functions (i.e. operations) of the devices and/or interfaces involved. The scale unit/upgrade domain refers to an impact level that indicates a number of interfaces involved. The scale unit/upgrade domain may identify a number of interfaces (or ports) of a network device, a number of rows and/or columns of interfaces of a network device, a number of network devices, etc. to be affected during operation 316. The scale unit/upgrade domain may be At 304, the group selection code selects one or more of the groups. The groups may be selected based on a predetermined fault plan, such as a predetermined error schedule or a predetermined connectivity interference schedule. The predetermined error schedule may indicate when the fault injection application 44 is to cause errors to (i) the selected groups, and/or (ii) the devices and interfaces in the selected groups. The predetermined connectivity interference schedule may indicate when the fault injection application 44 is to disable, turn OFF, prevent further operation, or transition to a standby or low power mode (i) the groups, and/or (ii) the devices and interfaces in the groups.

At 306, the fault and restore code 174 may determine a planned error set to be implemented at 316 based on the predetermined fault plan. The fault plan may indicate: errors to be caused; error patterns; time periods, durations, frequencies, and/or duty cycles of the errors; device IDs to experience the errors; interface IDs to experience the errors, etc. The planned error set indicates the errors to be caused by the fault injection application 44. As a first example of a planned error set, the fault and restore code 174 may at predetermined event times and for predetermined event periods temporarily disable and/or shut OFF interfaces in the selected groups. As another example, the fault and restore code 174 may transition (or cycle) the interfaces between ON and OFF states at a predetermined frequency, duty cycle, and/or pattern. As yet another example, the fault and restored code 174 [MN1]may temporarily cause the interfaces in the selected group to operate inappropriately, receive and/or output incorrect data, and/or block signals to and/or from the interfaces. The errors may occur in predetermined patterns. The fault and restore code 174 may determine in which order to turn OFF the interfaces of each network device involved and/or in which order to turn OFF the interfaces along a transmission path.

The planned error set may be implemented in a manner to minimize transmission delays and/or downtime of interfaces and/or network devices while informing the appropriate network devices and/or customers of the implementation. Network devices and/or interfaces not involved in the implementation may perform the regularly scheduled tasks intended to be performed by the network devices and/or interfaces involved in the implementation to minimize delays and/or perceived errors by customers. In one embodiment, the fault and restore code 174 creates the planned error set to minimize impact on production traffic. Production traffic refers to traffic associated with production network devices implemented in the field for customers. The production network devices are not involved in preproduction testing. The fault and restore code 174 may base the planned error set on prior information indicating a number of possible alternate transmission routes. If the number of alternative transmission routes is less than a predetermined amount, then the fault and restore code 174 refrains from implementing the planned error set.

The planned error set may include injecting errors in one or more different layers of the network. For example, the planned error set may include shutting down only interfaces of a particular layer, such as only L3 interfaces or L1 interfaces. In one embodiment, interfaces in multiple layers are shut down.

At 308, the utilization code 173 is executed to determine utilization parameters. An example utilization parameter is a current utilization level for a network path of transmission. A network path of transmission may refer to the network devices and interfaces between a local IP device (or first endpoint device) and a remote IP device (or second endpoint device). The current utilization level may indicate the percentage of interfaces and/or possible data transmission routes along the path that are being utilized. In one embodiment, operation 308 may be performed prior to operation 302.

At 310, the fault and restore code 174 is executed to determine whether a first limit will be exceeded if a planned error set is implemented. An example of the first limit is a maximum utilization limit. The maximum utilization limit refers to a current network utilization level and more specifically to a utilization limit not to be exceeded. For example, if a network path between a local IP device and a remote IP device is 80% utilized and the maximum utilization limit is 80%, then the fault injection application 44 waits until the current network utilization level is less than 80% before implementing the planned error set. If the first limit is to be exceeded, operation 312 may be performed; otherwise operation 314 may be performed.

At 312, the fault and restore code 174 may wait a predetermined period prior to returning to operation 308. In addition to and/or as an alternative to performing operation 312, operation 302 may be performed to adjust the corresponding scale unit/upgrade domain. In one embodiment, operation 312 is performed a predetermined number of times before returning to operation 302 to adjust the scale unit/upgrade domain.

At 314, the fault and restore code 174 may determine whether another predetermined limit is to be exceeded. Any number of predetermined limits may be checked prior to proceeding to operation 316. An example of another predetermined limit is a maximum interface failing limit. The maximum interface failing limit refers to a number of failing interfaces of a router and more specifically to a failure limit not to be exceeded for the router. For example, if a router has X number (e.g., 2) of failed interfaces or a Y % (e.g., 5%) of interfaces of the router have failed and a number of interfaces of the router that are planned to be shutdown (disabled or turned OFF) causes the number of failed interfaces or the percentage of failed interfaces to exceed predetermined limits, then the fault injection application 44 waits until the planned shutdown will not cause one or more of the predetermined limits to be exceeded. As another example, if a router has X number of interfaces shutdown due to planned or unplanned maintenance and shutting down additional interfaces would cause one or more of the predetermined limits to be exceeded, then the fault injection application 44 waits to perform the planned shutdown until the predetermined limits will not be exceeded. If one or more of the predetermined limits is to be exceeded, operation 312 may be performed; otherwise operation 316 may be performed.

At 316, the fault and restore code 174 implements the selected planned error set. This may include causing one or more errors and/or shutting down one or more interfaces for the selected group, as described above. In one embodiment, the method of FIG. 8 and operation 316 are iteratively performed, such that each interface in the network receives an error and/or is disabled in a predetermined pattern. The planned error sets may be implemented during scheduled maintenance periods or outside the predetermined scheduled maintenance periods.

In one embodiment, the planned error sets may involve only devices and interfaces associated with a particular service provider. In another embodiment, the planned error sets involve (i) devices and interfaces owned by and/or associated with a particular service provider, and/or (ii) devices and interfaces not owned by the service provider and/or customers of the service provider. Third party devices and interfaces may be notified and/or requested to implement at least a portion of one or more of the planned service sets. This may occur, for example, on systems that are outsourced managed for the service provider. The fault injection application 44 may coordinate timing of implementing planed errors with one or more devices of the third parties involved. This coordination may occur with a digital network administrator (DNA) of a third party and may include the fault injection application 44 sending request signals to the third party devices and the third party devices causing the corresponding errors. Alerts/responses associated with the errors may be transmitted from the third party devices to the insights analytics application 48, which may then provide corresponding log data to the correlation application. In another embodiment, the fault injection application 44 signals network operators to enter commands to toggle states of interfaces of corresponding equipment to implement certain errors.

At 317, the collection code 180 (or "sniffer") collects log data from the insights analytics application 48. The log data includes alerts and/or responses associated with error events and generated by (i) the network devices and/or interfaces in the selected group, and/or (ii) other network devices and/or interfaces in communication with the network devices and/or interfaces in the selected group. The network devices and/or interfaces that are not in the selected group may be adjacent equipment that is located near and connected to the network devices and/or interfaces in the selected group. The network devices and/or interfaces that are not in the selected group, but that generate alerts and/or responses associated with the implemented planned error set, may be remotely located away from and thus not be directly coupled to the network devices and/or interfaces in the selected group. Any number of intervening devices may be located between (i) the network devices and interfaces in the selected group and (ii) the network devices and interfaces outside the selected group that are providing alerts and/or responses.

As an example, the network devices and/or interfaces between a local IP device in a first city may be in communication with a remote IP device in a second city. A planned error set may include shutting OFF interfaces of the remote IP device. The remote IP device and any intervening devices between the remote IP device and the local IP device (e.g., L3 devices and/or optical/L1 devices) may generate alerts and/or responses. These alerts and responses may be recorded as log data and collected by the collection code 180. The log data may include timestamps, errors (e.g., a system log error, a loss of signal error, a synchronization error, and/or other errors), interface (or port) IDs, IP addresses of the interfaces and/or network devices, network device IDs, cable IDs, etc. The log data may further include a correlation ID, node IDs, notification IDs, error IDs, severity levels of errors, etc.

At 317 or at 318, the collection code 180 may collect, in addition to the log data collected at 317, data associated with traffic flow. The traffic flow data may indicate traffic flow rates, amounts of traffic, etc. at network devices involved. The alerts/responses collected may also be an indicator of traffic flow. The alerts/responses may indicate when traffic flow has decreased and/or stopped and/or other related issues. Operation 318 may be performed subsequent to operation 317 as shown or any one of operations 319, 320, 322. At 318, the collection code 180 may evaluate traffic flow and determine whether the implementation performed at 316 has impacted traffic flow, such that there are increased delays. If there are increased delays, and/or if the increases in delays exceed predetermined thresholds, then operation 302 may be performed to change the devices and/or interfaces involved, timing of the planned error set, and/or to change the planned error set. Although not shown in FIG. 8, the fault injection application 44 may reverse the planned error set, such that the errors created at 316 no longer exist. This may include reactivating devices and/or interfaces.

At 319, the fault event monitoring code 182 may collect information from the fault injection application 44 including the planned error set, the predetermined error schedule, the predetermined connectivity interference schedule, and/or the predetermined fault plan. In one embodiment, the fault event monitoring code 182 collects some of this information and/or related information from the event manager application 62 of FIG. 1.

At 320, based on the planned error set, the predetermined error schedule, the predetermined connectivity interference schedule, the predetermined fault plan, the collected log data, and/or other related information, the correlation application 50 analyzes and correlates this information to detect and/or identify physical connections. The correlation is performed to determine a physical network state (or an as-built network topology snapshot), which refers to a state of the physical connections of a network. The correlation application 50 determines the cause (e.g., one or more errors) and effect (e.g., one or more alerts/responses) pairs and/or sets. Identification of connections may include identifying each interface port, each cable, each fiber or lead of a cable, and each network device along a transmission path.

Spatial relationships (i.e. locations of devices relative to other devices) may also be determined. The outputs of multiple interfaces of a router may be combined and/or multiplexed and transmitted along a single fiber and/or lead of a cable. These connections may be determined. Alerts/responses (or alarms) may be tracked for interfaces and devices in a local area, in a remote area, and any intervening areas. In one embodiment, L1 interfaces are shut down at a client side, and both local and remote side related alarms are tracked including L1-to-L1, L3-to-L3, and L1-to-L3 connections. In another embodiment, errors are injected on optical client side interfaces and alarms or errors occurring at routers associated with the injected errors are tracked. Remote error counter values and/or increments may also be tracked and correlated to determine L1-to-L1, L3-to-L3 and L1-to-L3 connections. Any combination of the above-stated examples may be implemented to implement a multi-layer mapping of a network topology.

The correlation application 50 correlates the log data including the alerts and/or responses to the implemented errors to identify physical connections including interface (or port) IDs, IP addresses of the interfaces and/or network devices, network device IDs, cable IDs, etc. This may include triangulating error event information and planned error set information to create a connectivity map of connections for multiple layers of the OSI model. This allows the correlation application 50 to determine the underlying effects of faulty network connections. The log data may include increased load values on certain network devices and/or interfaces due to implementation of the planned error set. The correlation may be based on a predetermined pattern of alerts and/or responses expected to be received when the selected planned error set is implemented. The expected alerts and/or responses may be based on a previously stored physical connection map, such as that stored as part of the physical connection database. The expected alerts and/or responses may be stored and compared to the collected alerts and/or responses. If the alerts and responses match, then the corresponding physical connections exist. If the expected alerts and/or responses do not match, then one or more physical connections do not exist and/or other physical connections exist.

Different types of errors provide different event alerts/responses. By scheduling a predetermined pattern of errors to be implemented, a resulting event alert/response pattern indicates whether certain physical connections exist or not. In one embodiment, layer identification and interface/network device identification is determined based on implemented error pattern and the corresponding alert/response pattern received. As another example, a first router in New York City may be shut off. A first alarm is generated from a first optical device in New York City. A second alarm is generated from a second optical device in San Francisco. A third alarm is generated from a second router in San Francisco. As a result, it is determined that: the first router is connected to the first optical device; the first optical device is connected to the second optical device; and the second optical device is connected to the second router.

The correlation application 50 may be initially unaware of one or more of the physical connections along a transmission path and/or the physical connections between a local interface of a local IP device and a remote interface of a remote IP device. For example, the correlation application 50 may not be initially aware of a destination of an outbound signal. The destination may refer to an interface of an end device that receives/terminates the outbound signal. The unknown connections may be determined by performing the stated correlation.

The correlation application 50 may receive thousands of alerts/responses during a short periods of time and correlate which alerts/response are associated with which planned error sets implemented. The correlation application 50 may correlate the alerts/responses based on timestamps of when the planned error sets are implemented and timestamps of when the alerts/responses are generated. The correlation may also be based on a pattern of errors, a frequency at which a device is transitioned between ON and OFF states, and/or other distinguishing features.

At 322, the quality checker application 52 verifies the physical connection identified during operation 320. This may include comparing connections detected by the correlation application 50 with connections in the physical connection database and/or connectivity state map to determine if any updates are needed. If for example differences exist, then the connectivity state map may be updated. The quality checker application 52 may send signals to network devices associated with the detected connections and/or network devices in communication with the network devices associated with the detected connections to verify the detected connections. The quality checker application 52 may update the physical connection database based on verified connections. The quality checker application 52 may inform the fault injection application 44 when the verification has been completed.

At 324, the fault injection application 44 determines whether there is another group of interfaces for which a planned error set is to be implemented. If there is another group, operation 306 may be performed, otherwise operation 302 may be performed as shown. As an alternative to returning to operation 302, the method may end subsequent to performing operation 324.

The above-described operations of FIG. 8 are meant to be illustrative examples; the operations may be performed sequentially, synchronously, simultaneously, continuously, during overlapping time periods or in a different order depending upon the application. Also, any of the operations may not be performed or skipped depending on the implementation and/or sequence of events.

Following the method of FIG. 8, the resource allocation application 53 may allocate resources (e.g., VMs, PMs, network devices, etc.), change connections, perform maintenance, and/or repair and/or replace devices based on the identified and verified physical connections and/or the updated connectivity state map and/or based on the utilization parameters and/or other above-stated information discovered during the operations of the method of FIG. 8. Requests may be generated to change physical connections and as a result resource allocation. For example, if it is determined that there is to many failed interfaces, a slow response time in rerouting signals, and/or other issue, connections may be changed, additional equipment may be connected, maintenance may be scheduled and/or performed, and/or one or more devices may be repaired and/or replaced.

The above-described examples provide scalable systems for automating and circuit mapping physical connections between devices of multiple layers of the OSI model (or network stack). The described methods identify and validate physical connections across multiple layers and may be applied to a stateless system. A stateless system refers to a system with no previous mapping of the physical connections of a corresponding network. The described methods may be iteratively performed to continuously, quickly and efficiently update the connectivity state of a network. Errors are injected safely into the network while preventing impact to traffic flow, such that latencies are not increased. The errors are systematically injected and correlation is performed based on an error schedule, logs, alarms, and signal responses to map the connectivity state of the network. The disclosed systems and methods are may be implemented on various networks and platforms and eliminate the need to spend time and resources performing connectivity audits.

The disclosed systems and methods may be used for validating network convergence, which is used to handle failover. Failover may refer to when a first device or interface is experiencing issues, such that the first device or interface is unable to handle a certain amount of load, and a second device or interface allocates resources to handle the load. When the above-described errors are injected into a network, alarms may be generated indicating whether failover has been handled appropriately. The correlation application 52 may validate whether network convergence has been perform appropriately based on the alarms generated.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

A processor may refer to a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The processor may include one or more interface circuits. In some examples, the interface circuits may include wired or wireless interfaces that are connected to a local area network (LAN), the Internet, a wide area network (WAN), or combinations thereof. The functionality of any given processor of the present disclosure may be distributed among multiple circuits that are connected via interface circuits. For example, multiple circuits may allow load balancing.

The term code, as used above, may include software, firmware, and/or microcode, and may refer to programs, routines, functions, classes, data structures, and/or objects. The term shared processor circuit encompasses a single processor circuit that executes some or all code from multiple circuits. The term group processor circuit encompasses a processor circuit that, in combination with additional processor circuits, executes some or all code from one or more circuits. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple circuits. The term group memory circuit encompasses a memory circuit that, in combination with additional memories, stores some or all code from one or more circuits.

The term memory or memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element; such as by encode instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as JavaScript Object Notation (JSON), hypertext markup language (HTML) or extensible markup language (XML), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A connectivity state mapping system for mapping physical connections between interfaces of devices in a network, the system comprising:
    at least one processor;
    at least one memory; and
    an application stored in the at least one memory and including instructions, which are executable by the at least one processor and are configured to:
        group the interfaces into a plurality of groups,
        select one of the plurality of groups based on a predetermined fault plan,
        determine utilization parameters corresponding to an interface of a device in the selected group,
        based on the utilization parameters, cause a fault in the interface of the device in the selected group,
        monitor events corresponding to the fault that is caused in the interface and log data indicative of any errors detected at any interface of the selected group, and
        based on the fault and the predetermined fault plan, correlate the data to identify physical connections between two or more of the devices in the network.

2. The connectivity state mapping system of claim 1, wherein:
    the instructions are further configured to refrain from causing the fault based on a maximum utilization limit and at least one of the utilization parameters; and
    the at least one of the utilization parameters indicates a current network utilization level.

3. The connectivity state mapping system of claim 1, wherein:
    the instructions are further configured to refrain from causing the fault based on a maximum interface failure limit and at least one of the utilization parameters; and
    the at least one of the utilization parameters indicates a current number or percentage of failed interfaces.

4. The connectivity state mapping system of claim 1, wherein:
    correlating the data includes identifying connections between a plurality of interfaces in multiple layers of an open systems interconnection model; and
    the interfaces of the devices include the plurality of interfaces.

5. The connectivity state mapping system of claim 1, wherein:
correlating the data includes identifying connections along a transmission path between a local device and a remote device;
a plurality of intermediary devices are connected in series between the local device and the remote device; and
the two or more of the devices include the local device, the remote device, and the intermediary devices.

6. The connectivity state mapping system of claim 1, wherein the instructions are further configured to group the interfaces based on at least one of a geographical region, a network device name, an interface identifier, or a scale value.

7. The connectivity state mapping system of claim 1, wherein the predetermined fault plan identifies:
error patterns including a plurality of faults for the plurality of groups; and
identifiers of interfaces in the plurality of groups.

8. The connectivity state mapping system of claim 7, wherein the predetermined fault plan identifies time periods, frequencies, or duty cycles of the plurality of faults.

9. The connectivity state mapping system of claim 1, wherein:
the predetermined fault plan includes a predetermined connectivity interference schedule; and
the instructions are further configured to override or modify the predetermined connectivity interference schedule based on the utilization parameters.

10. The connectivity state mapping system of claim 9, wherein the predetermined connectivity interference schedule indicates timing of when to cause faults in the interfaces of the plurality of groups.

11. The connectivity state mapping system of claim 1, wherein the fault includes turning OFF, preventing further operation, or transitioning to a standby or low power mode the interface.

12. The connectivity state mapping system of claim 1, wherein the instructions are further configured to:
verify the physical connections; and
update a connectivity state map of the network.

13. The connectivity state mapping system of claim 1, wherein the instructions are further configured to allocate resources or change physical connections based on the identification of the physical connections.

14. A connectivity state mapping system for mapping physical connections of devices in a network, the system comprising:
a processor;
a memory; and
an application stored in the memory and including instructions, which are executable by the processor and are configured to:
group the devices or interfaces of the devices into a plurality of groups,
select one of the plurality of groups based on a predetermined connectivity interference schedule,
determine utilization parameters corresponding to an interface of a device in the selected group,
based on the utilization parameters and the connectivity interference schedule, cause an error in the interface of the device in the selected group,
monitor events corresponding to the error that is caused in the interface and log data indicative of any other errors detected at any device of the selected group, and
based on the error and the predetermined connectivity interference schedule, correlate the data to identify physical connections between two or more of the interfaces in the network.

15. The connectivity state mapping system of claim 14, wherein the instructions are further configured to:
refrain from causing the error based on a maximum utilization limit and a first utilization parameter, wherein the first utilization parameter indicates a current network utilization level; and
refrain from causing the error based on a maximum interface failure limit and a second utilization parameter, wherein the second utilization parameter indicates a current number or percentage of failed interfaces.

16. The connectivity state mapping system of claim 14, wherein:
correlating the data includes identifying connections between a plurality of interfaces in multiple layers of an open systems interconnection model; and
the interfaces of the devices include the plurality of interfaces.

17. The connectivity state mapping system of claim 14, wherein:
correlating the data includes identifying connections along a transmission path between a local device and a remote device;
a plurality of intermediary devices are connected in series between the local device and the remote device; and
the two or more of the interfaces include the local device, the remote device, and the intermediary devices.

18. A non-transitory tangible computer readable medium storing instructions executable by a processor for mapping physical connections of devices in a network, the instructions are for:
grouping the devices or interfaces of the devices into a plurality of groups,
selecting one of the plurality of groups based on a predetermined fault plan,
determining utilization parameters corresponding to an interface of a device in the selected group,
based on the utilization parameters and the predetermined fault plan, causing an error in the interface of the device in the selected group,
monitoring events corresponding to the error that is caused in the interface and log data indicative of any other errors detected at any device of the selected group, and
based on the error and the predetermined fault plan, correlating the data to identify physical connections between two or more of the interfaces in the network.

19. The non-transitory tangible computer readable medium of claim 18, wherein the instructions are for:
refraining from causing the error based on a maximum utilization limit and a first utilization parameter, wherein the first utilization parameter indicates a current network utilization level; and
refraining from causing the error based on a maximum interface failure limit and a second utilization parameter, wherein the second utilization parameter indicates a current number or percentage of failed interfaces.

20. The non-transitory tangible computer readable medium of claim 18, wherein:
correlating the data includes identifying connections along a transmission path between a local device and a remote device;

a plurality of intermediary devices are connected in series between the local device and the remote device; and
the two or more of the interfaces include the local device, the remote device, and the intermediary devices.

\* \* \* \* \*